(12) United States Patent
Ballard et al.

(10) Patent No.: US 11,012,407 B2
(45) Date of Patent: May 18, 2021

(54) SYSTEM AND METHOD OF UTILIZING MULTIPLE NETWORKS

(71) Applicant: Dell Products L.P., Round Rock, TX (US)

(72) Inventors: Lee E. Ballard, Georgetown, TX (US); Wade Andrew Butcher, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 99 days.

(21) Appl. No.: 15/795,790

(22) Filed: Oct. 27, 2017

(65) Prior Publication Data

US 2019/0132283 A1   May 2, 2019

(51) Int. Cl.
*H04L 29/12* (2006.01)
*H04L 12/715* (2013.01)
*H04L 29/08* (2006.01)

(52) U.S. Cl.
CPC ........ *H04L 61/256* (2013.01); *H04L 61/1511* (2013.01); *H04L 61/1541* (2013.01); *H04L 61/251* (2013.01); *H04L 61/2517* (2013.01); *H04L 45/04* (2013.01); *H04L 61/2585* (2013.01); *H04L 61/6022* (2013.01); *H04L 67/16* (2013.01)

(58) Field of Classification Search
CPC . H04L 61/256; H04L 61/1511; H04L 61/251; H04L 45/04; H04L 61/6022; H04L 67/16; H04L 69/08; H04L 12/66; H04L 41/0226; H04L 69/167; H04L 45/586; H04W 80/045

USPC ........................................................ 709/245
See application file for complete search history.

(56) References Cited

U.S. PATENT DOCUMENTS 6,907,037 B2 * 6/2005 Tsuchiya ............. H04L 12/1836
370/390
7,403,522 B2 * 7/2008 Tsuchiya ................. H04L 12/18
370/390
9,832,168 B2 * 11/2017 Kloberdans ......... H04L 63/0236
(Continued)

OTHER PUBLICATIONS

Cheshire, Stuart et al. "Dynamic configuration of IPv4 link-local addresses." No. RFC 3927. 2005; 33 pages, 2005.
(Continued)

*Primary Examiner* — Hermon Asres
(74) *Attorney, Agent, or Firm* — Baker Botts L.L.P.

(57) ABSTRACT

In one or more embodiments, an information handling system (IHS) may receive, from another IHS via a first network, a dynamic host configuration protocol discovery request, provide, via the first network, a first Internet protocol version four (IPv4) address to the other IHS, and associate a first Internet protocol version six (IPv6) address. The IHS may receive a domain name service (DNS) lookup request from the first information handling system, provide a multicast DNS (mDNS) request, based at least on logical name information from the DNS lookup request, to a second network, and receive a mDNS response that includes a second IPv6 address associated with the logical name information from the DNS lookup request. In response to receiving the mDNS response, the IHS may configure at least one network address translation configuration that associates the second IPv6 address and a second IPv4 address.

11 Claims, 9 Drawing Sheets

(56) References Cited

U.S. PATENT DOCUMENTS

| | | | |
|---|---|---|---|
| 9,876,689 B1* | 1/2018 | Gan | H04L 41/26 |
| 2001/0040895 A1* | 11/2001 | Templin | H04L 61/6004 |
| | | | 370/466 |
| 2005/0015507 A1* | 1/2005 | Chin | H04L 29/06 |
| | | | 709/230 |
| 2009/0248896 A1* | 10/2009 | Cohn | H04L 29/12028 |
| | | | 709/245 |
| 2010/0287548 A1* | 11/2010 | Zhou | G06F 9/4856 |
| | | | 718/1 |
| 2011/0106947 A1* | 5/2011 | Lin | H04L 29/12915 |
| | | | 709/225 |
| 2012/0005299 A1* | 1/2012 | Xu | H04L 29/12358 |
| | | | 709/208 |
| 2012/0218998 A1* | 8/2012 | Sarikaya | H04L 12/1836 |
| | | | 370/390 |
| 2013/0044759 A1* | 2/2013 | Reed | H04L 69/08 |
| | | | 370/401 |
| 2013/0046899 A1* | 2/2013 | Harrington | H04L 61/6086 |
| | | | 709/230 |
| 2013/0205035 A1* | 8/2013 | Chen | H04L 61/251 |
| | | | 709/230 |
| 2014/0122681 A1* | 5/2014 | Imai | H04L 41/04 |
| | | | 709/223 |
| 2014/0215087 A1* | 7/2014 | Zhao | H04L 61/6022 |
| | | | 709/231 |
| 2015/0200806 A1* | 7/2015 | Donley | H04L 45/58 |
| | | | 370/392 |
| 2015/0222480 A1* | 8/2015 | Gan | H04L 61/103 |
| | | | 709/222 |
| 2015/0222542 A1* | 8/2015 | Inada | H04L 45/741 |
| | | | 370/395.52 |
| 2015/0222734 A1* | 8/2015 | Inada | H04W 76/32 |
| | | | 370/315 |
| 2015/0281251 A1* | 10/2015 | Lin | H04L 63/10 |
| | | | 726/1 |
| 2015/0295862 A1* | 10/2015 | Banerjee | H04L 49/3009 |
| | | | 370/392 |
| 2016/0006822 A1* | 1/2016 | Kloberdans | H04L 41/5054 |
| | | | 709/204 |
| 2016/0255175 A1* | 9/2016 | Albrecht | H04L 61/6068 |
| | | | 709/245 |
| 2016/0330119 A1 | 11/2016 | Singh et al. | |
| 2016/0344688 A1* | 11/2016 | Lakhera | H04L 61/251 |
| 2018/0152345 A1* | 5/2018 | Zhang | H04L 61/251 |

OTHER PUBLICATIONS

Rekhter, Yakov et al. "Address allocation for private internets." No. RFC 1918. 1996; 9 pages, 1996.

Hinden, Robert M et al. "Unique local IPv6 unicast addresses." (2005); 16 pages, 2005.

Gulbrandsen, Arnt, and Levon Esibov. "A DNS RR for specifying the location of services (DNS SRV)." (2000); 12 pages, 2000.

Hinden, Robert M., and Stephen E. Deering. "IP version 6 addressing architecture." (2006); 26 pages, 2006.

Srisuresh, Pyda, and Matt Holdrege. "IP network address translator (NAT) terminology and considerations." (1999); 30 pages, 1999.

Droms, Ralph. "Dynamic host configuration protocol." (1993); 39 pages, 1993.

Vaughan-Nichols, Steven. "Five ways for IPv6 and IPv4 to peacefully co-exist." ZDNet, Oct. 14, 2010, Retrieved from url: http://www.zdnet.com/article/five-ways-for-ipv6-and-ipv4-to-peacefully-co-exist/; 10 pages, Oct. 14, 2010.

Cheshire, Stuart et al. "DNS-Based Service Discovery" No. RFC 6763. 2013; 49 pages, 2013.

Cheshire, Stuart et al. "Multicast DNS" No. RFC 6762. 2013; 70 pages, 2013.

* cited by examiner

SYSTEM AND METHOD OF UTILIZING MULTIPLE NETWORKS

BACKGROUND

Field of the Disclosure

This disclosure relates generally to information handling systems and more particularly to utilizing multiple networks.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, an information handling system may receive, from a first information handling system via a first network and via an Internet protocol version four (IPv4), a dynamic host configuration protocol discovery request, provide, via the first network, a first IPv4 unicast address to the first information handling system, and associate a first Internet protocol version six (IPv6) unicast address, that is based at least on the first IPv4 unicast address, with the IPv4 unicast address. The information handling system may further receive a domain name service (DNS) lookup request from the first information handling system. In response to receiving the DNS lookup request, the information handling system may provide a multicast DNS (mDNS) request, based at least on logical name information from the DNS lookup request, to a second network, different from the first network. The information handling system may further receive a mDNS response that includes a second unicast IPv6 address associated with the logical name information from the DNS lookup request. For example, the second unicast IPv6 address may be associated with a second information handling system. In response to receiving the mDNS response that includes the second unicast IPv6 address associated with the logical name information from the DNS lookup request, the information handling system may configure at least one network address translation configuration that includes at least one port mapping, that associates the first IPv6 unicast address and the first IPv4 unicast address, and that associates the second IPv6 unicast address and a second IPv4. The information handling system may further provide a DNS response, associated with the logical name information from the DNS lookup request, that includes the second unicast IPv4 address to the first information handling system. The information handling system may further exchange data between the first IPv4 unicast address and the second IPv6 unicast address.

In one or more embodiments, exchanging the data between the first IPv4 unicast address and the second IPv6 unicast address may include receiving an IPv4 packet from the first information handling system, wherein the IPv4 packet includes the first IPv4 unicast address as a source address, the second IPv4 unicast address as a destination address, and payload data and providing an IPv6 packet to the second network, wherein the IPv6 packet includes the first IPv6 unicast address as a source address, the second IPv6 unicast address as a destination address, and the payload data. In one or more embodiments, the first IPv6 unicast address may be further based at least on a media access control (MAC) address of a container. For example, the container may be or include an operating system level virtualization. For instance, operating system level virtualization may include one or more portions of a kernel of an operating system that may permit multiple isolated user space instances of collections of processes (e.g., programs, applications, services, etc.). In one or more embodiments, the information handling system may further provide, to the second network, a mDNS announcement based at least on a hostname of the first information handling system. In one or more embodiments, one or more of the first IPv4 address and the second IPv4 address may be or include respective IPv4 unicast link-local addresses.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
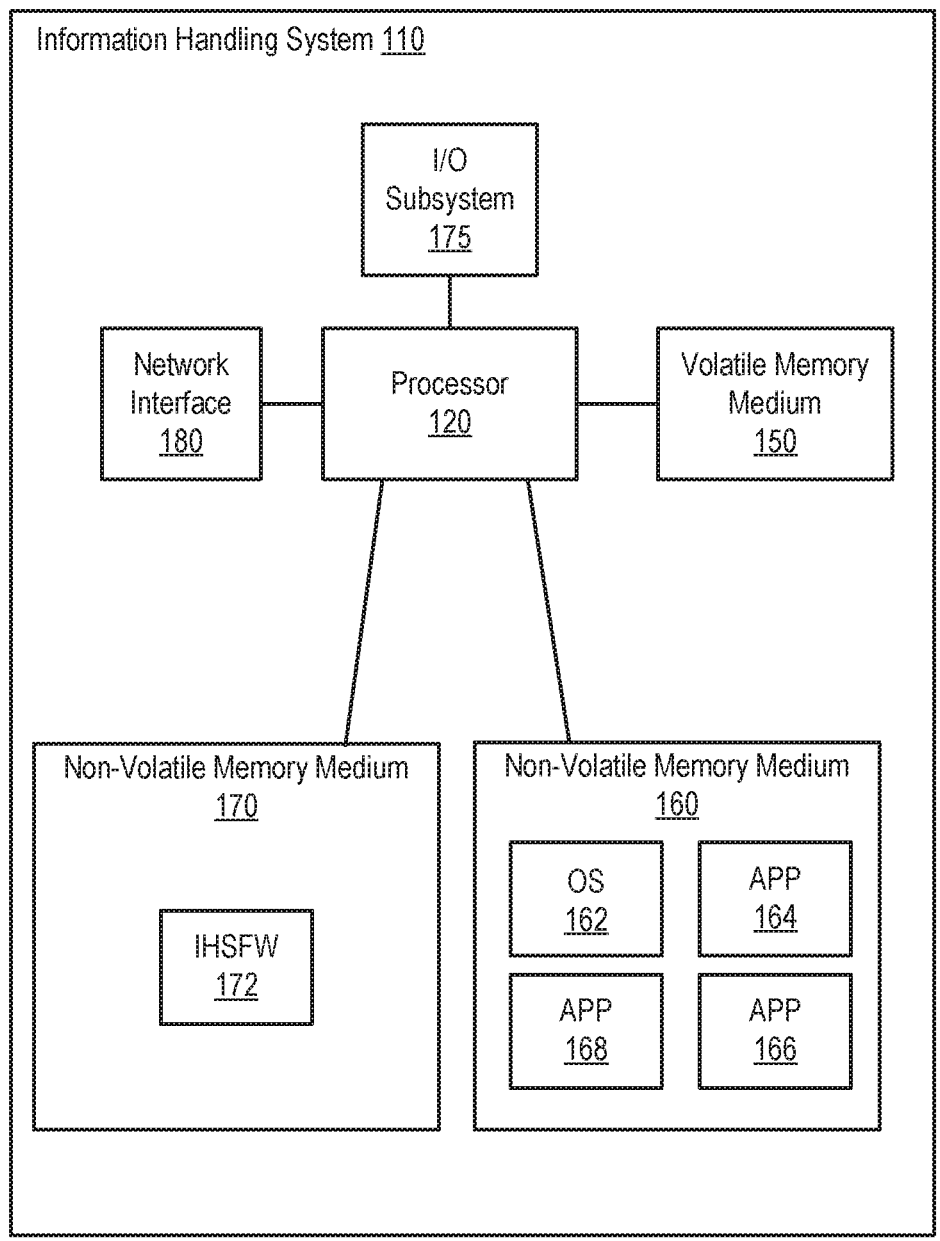
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, some information handling systems may not implement a networking protocol or may not implement the networking protocol correctly. For example, some information handling systems may not implement an Internet protocol version six (IPv6) networking protocol or may not implement the IPv6 networking protocol correctly.

In one or more embodiments, one or more internal private networks may be utilized. For example, the one or more internal private networks may be utilized in managing one or more information handling systems. In one instance, the one or more information handling systems may be included in a rack and/or a chassis. In another instance, the one or more information handling systems may be or include modular systems. In one or more embodiments, one or more modular systems may utilize virtual local area networks (VLANs). For example, the VLANs may be utilized in one or more internal private networks and/or may be utilized to implement one or more external private and/or public networks.

In one or more embodiments, one or more modular systems may include a remote access controller. For example, the remote access controller may be or include a Dell Remote Access Controller (DRAC). In one or more embodiments, a remote access controller may be integrated into an information handling system. For example, the remote access controller may be or include an integrated Dell Remote Access Controller (iDRAC). In one or more embodiments, a remote access controller may include one or more of a processor, and a memory, a network interface, among others. In one or more embodiments, a remote access controller may access one or more busses and/or one or more portions of an information handling system. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller (BMC) integrated circuits. For example, the remote access controller may be based at least on an Intelligent Platform Management Interface (IPMI) standard. For instance, the remote access controller may allow and/or permit utilization of IPMI out-of-band interfaces such as IPMI Over LAN (local area network). In one or more embodiments, a remote access controller may include and/or provide one or more internal private networks. For example, the remote access controller may include and/or provide one or more of an Ethernet interface, a front panel universal serial bus (USB) interface, and a Wi-Fi interface, among others.

In one or more embodiments, an information handling system may be coupled to one or more of an external network and an internal network, among others. For example, the information handling system may be multi-homed. For instance, it may be a requirement that no Internet protocol (IP) address exist in both the external network and the internal network. In one or more embodiments, the information handling system may include multiple network interfaces for coupling to multiple networks and one routing table. For example, the information handling system may utilize IPv6 Unique Local Addresses (ULAs) with one or more private networks. For instance, utilizing ULAs may permit and/or allow the information handling system to utilize multiple prefixes for IPv6 addresses for the one or more private networks. In one or more embodiments, utilizing ULAs may prevent and/or mitigate a network address conflict with multiple network interfaces of the information handling system.

In one or more embodiments, an information handling system may be utilized in providing one or more structures and/or functionalities associated with utilizing ULAs and/or other IPv6 addresses. For example, utilizing the one or more structures and/or functionalities associated with utilizing ULAs and/or other IPv6 addresses, the information handling system may provide and/or permit one or more other information handling systems that may lack one or more capabilities of utilizing ULAs and/or other IPv6 addresses. For instance, one or more laptops, one or more tablet computing devices, and/or one or more other computing devices may not be capable of utilizing ULAs and/or other IPv6 addresses, and the information handling system may be able to provide and/or permit the one or more laptops, tablet computing device, or other computing device to effectively utilize ULAs and/or other IPv6 addresses with one or more networks (e.g., one or more private networks).

In one or more embodiments, the information handling system may utilize one or more IPv4 addresses with the one or more laptops, tablet computing device, or other computing device. In one example, the one or more IPv4 addresses may include private addresses. For instance, the private addresses may be or include addresses described in Request for Comments (RFC) 1918. In another example, the one or more IPv4 addresses may include Automatic Private IP Addresses (APIPAs) (e.g., link-local addresses). In one instance, the APIPAs may be or include addresses described in RFC 3927. In another instance, the APIPAs may be or include addresses of 169.254.0/24 and/or 169.254.255/24, among others. In one or more embodiments, utilizing APIPAs may be advantageous and/or preferred, as private addresses (described by RFC 1918) may already be utilized by other information handling systems and/or other equipment coupled to a network. For example, utilizing APIPAs may prevent or mitigate a chance that two devices of a network utilize the same network address.

In one or more embodiments, IPv4 address may not be unique. For example, a set of IPv4 addresses may be utilized multiple times. For instance, multiple chassis (e.g., blade chassis) may utilize the same set of IPv4 address with one or more private networks. In one or more embodiments, a chassis may include a translator that may provide one or more structures and/or functionalities associated with utilizing ULAs and/or other IPv6 addresses to one or more information handling systems that may lack one or more capabilities of utilizing ULAs and/or other IPv6 addresses. For example, the translator may dynamically map IPv4 address to ULAs and/or other IPv6 addresses. For instance, a first translator may utilize a first prefix and a second translator may utilize a second prefix, such that even though the two devices, coupled to different translators, have the same IPv4 address, the two devices may have different IPv6 addresses. In one or more embodiments, a translator may provide dynamic port mapping. For example, static provisioning of port mappings may be eliminated.

In one or more embodiments, a translator may include two network interfaces. In one example, the two network interfaces may be on a single physical network interface. In one instance, the single physical network interface may be configured to receive and/or route packets for and/or to a first network interface of the two network interfaces of the translator, where the packets are addressed to a media access control (MAC) address of the first network interface of the two network interfaces of the translator. In another instance, the single physical network interface may be configured to receive and/or route packets for and/or to a second network interface of the two network interfaces of the translator, where the packets are addressed to a MAC address of the second network interface of the two network interfaces of the translator. In this fashion, the single physical network interface may be configured with multiple MAC addresses (e.g., destination MAC addresses) that may be utilized in implementing or assisting in implementing multiple virtual network interfaces. In another example, the two network interfaces may include two VLANs. In one instance, the two VLANs may include two MAC VLANs. In another instance, the two VLANs may include two IP VLANs.

In one or more embodiments, a first interface of the two network interfaces may be utilized for IPv6 network traffic, and a second interface of the two network interface may be utilized for IPv4 network traffic. For example, network address translation (NAT) may be utilized in communicating and/or transferring network traffic between the first network interface and the second network interface. In one or more embodiments, discovery may be implemented and/or enabled via a multicast domain name service (mDNS) application level gateway (ALG). In one example, if information handling system in an IPv4 network (e.g., an IPv4 network coupled to the first network interface) supports mDNS, mDNS announcements from the information handling system in the IPv4 network may be translated and provided to an IPv6 network (e.g., an IPv6 network coupled to the second network interface). In another example, IPv6 mDNS announcements may be translated into IPv4 addresses and/or ports (e.g., service ports) and provided to the IPv4 network. In one or more embodiments, the mDNS ALG may create and/or configure one or more NAT port mappings (e.g., NAT64 port mappings) that may permit and/or allow IPv4 information handling systems to communicate with IPv6 services.

In one or more embodiments, if an IPv4 information handling system does not support mDNS, the translator may provide a dynamic host configuration (DHCP) daemon (e.g., a DHCP service) that may translate a hostname of the DHCP discovery into a mDNS announcement. If the IPv4 device uses a domain name service (DNS) service record (SRV record), a DNS service and/or functionality may translate the DNS SRV record request (e.g., a hostname and one or more service ports) into an IPv6 mDNS lookup and may create and/or configure one or more NAT64 port mappings. If the IPv4 information handling system supports DNS address record (e.g., DNS A record) lookup, the DNS service may perform an IPv6 mDNS lookup and allocate an IPv4 address, from a network address set, to the IPv6 service for a time-to-live (TTL) of the DNS response such that all ports of the allocated IPv4 address may map to the IPv6 address. In one or more embodiments, an IPv6 private network may be associated with a 64-bit prefix. For example, a translator may map a 32-bit IPv4 address into a 64-bit IPv6 address, where remaining 32 bits may be unique to each translator. For instance, the remaining 32 bits may be based at least on or may be derived from a MAC address of the translator.

In one or more embodiments, utilizing the MAC address of the translator to at least base and/or derive the remaining 32 bits of the IPv6 address may permit and/or allow an IPv6 information handling system and multiple IPv4 information handling systems, that are service via different translators, to communicate, even though the multiple IPv4 information handling systems may share the same IPv4 address. In one or more embodiments, a first IPv4 information handling system that utilizes a first translator and a second IPv4 information handling system that utilizes a second translator may discover one-another and may communicate with one another via their translated IPv6 addresses. For example, the first IPv4 information handling system and the second IPv4 information handling system may utilize the same IPv4 address or may utilize different IPv4 addresses. In one instance, the first IPv4 information handling system and the second IPv4 information handling system may utilize 169.254.7.5. In another instance, the first IPv4 information handling system may utilize 169.254.7.5, and the second IPv4 information handling system may utilize 169.254.7.249.

Turning now to FIG. 1, an exemplary information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a portable wireless information handling system that is configured to be handheld by user, a mobile device, a personal digital assistant (PDA), a tablet computing device, a consumer electronic device, an electronic music player, an electronic camera, a wireless access point, an electronic video player, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2:
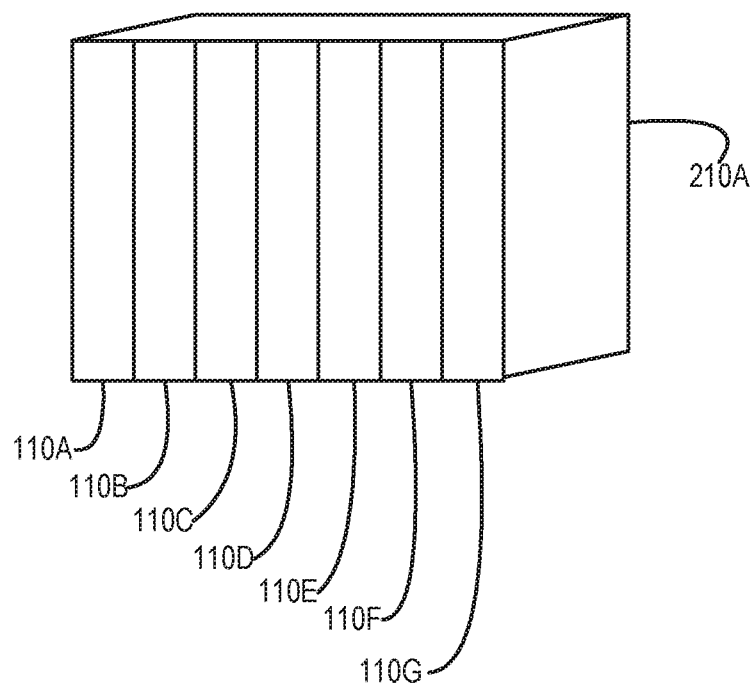
FIG. 2 illustrates examples of blade chassis, according to one or more embodiments.
Figure 2:
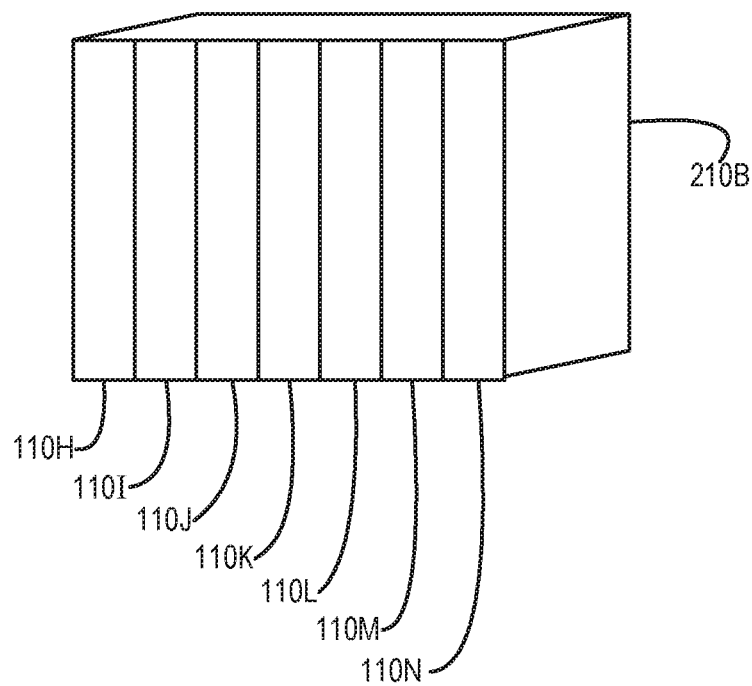

Turning now to FIG. 2, examples of blade chassis are illustrated, according to one or more embodiments. As shown, a blade chassis 210A may include information handling systems (IHSs) 110A-110G, and a blade chassis 210B may include IHSs 110H-110N. In one or more embodiments, blade chassis 210 may include one or more management IHSs. In one example, IHS 110A may be or include a management IHS for blade chassis 210A. In another example, IHSs 110H and 110I may be or include management IHSs for blade chassis 210B. For instance, IHS 110I may be or include a redundant management IHS for blade chassis 210B. In one or more embodiments, one or more of IHSs 110A-110N may be hot-swappable.

Figure 3:
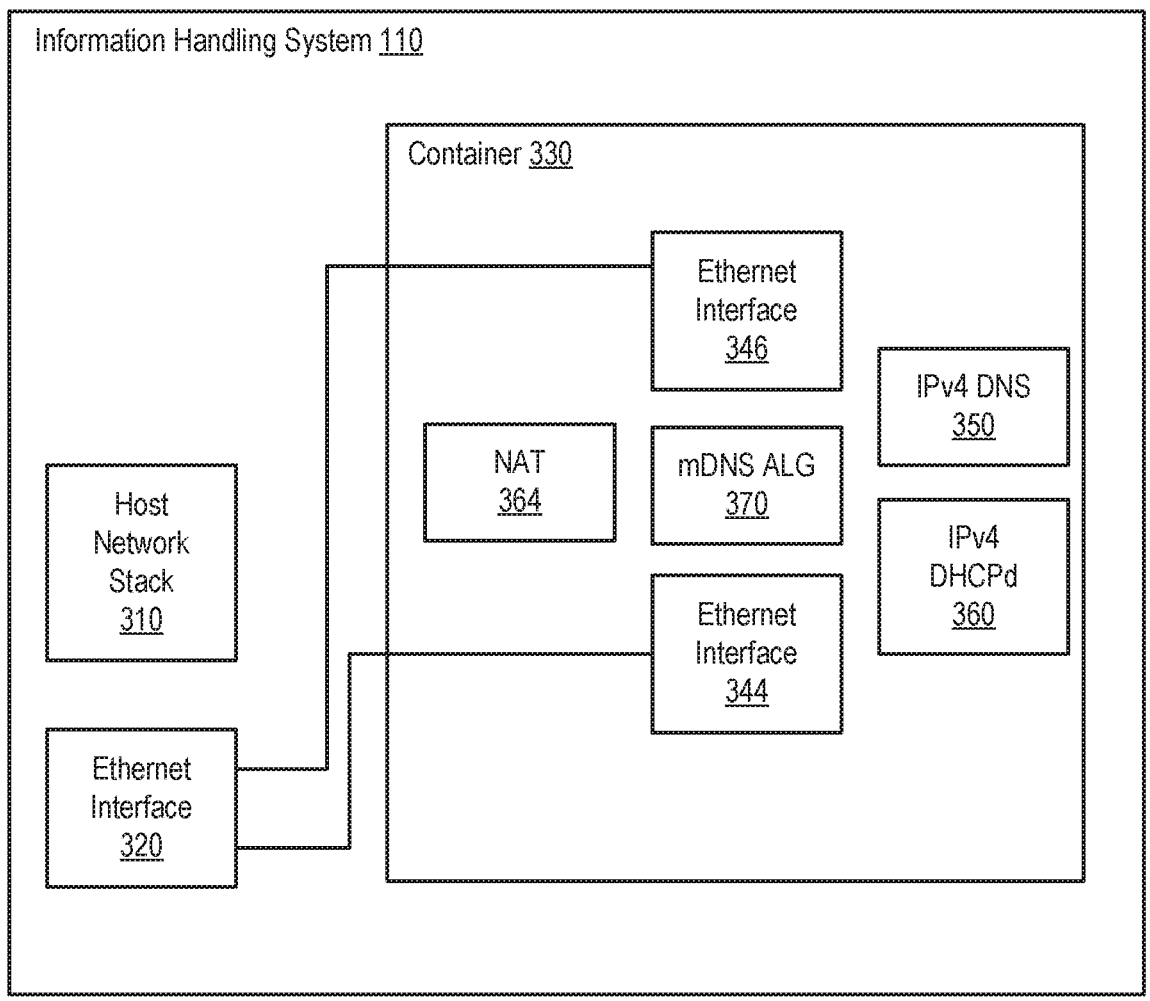
FIG. 3 illustrates an example of a configuration of an information handling system, according to one or more embodiments.

Turning now to FIG. 3, an example of a configuration of an information handling system is illustrated, according to one or more embodiments. As shown, IHS 110 may include a host network stack 310, an Ethernet interface 320, and a container 330. In one or more embodiments, a container may be or include an OS level virtualization. For example, OS level virtualization may include one or more portions of a kernel of an OS that may permit multiple isolated user space instances of collections of processes (e.g., programs, applications, services, etc.). For instance, these user space instances may be referred to as "containers", "software containers", "virtualization engines", or "jails" (e.g., Free-BSD jails, chroot jails, etc.).

In one or more embodiments, utilizing OS level virtualization, an OS may behave, may function, and/or may appear as and/or like multiple different, individual information handling systems. In one example, a container may include its own network routing table. In one instance, utilizing one or more containers may allow and/or permit IHS 110 and/or OS 162 to utilize and/or implement multiple routing tables. In another instance, IHS 110 and/or OS 162 may utilize and/or implement multiple routing tables via utilizing one or more containers. In another example, a container may be or include software in a file system that includes one or more of instructions executable by a processor (e.g., a program, software, an application, server software, a service, etc.), one or more runtime libraries, one or more system tools, and one or more system libraries, among others. For instance, a container may be or include a Docker container, a LXC (Linux container), or a Kubernetes pod, among others. In one or more embodiments, container 330 may be any virtual instance. For example, container 330 may be or include a virtual machine.

As illustrated, container 330 may include Ethernet interfaces 344 and 346, an IPv4 DNS 350, an IPv4 DHCP daemon (DHCPd) 360, a NAT 364, and a mDNS ALG 370. In one or more embodiments, an ALG may enable a gateway to be augmented with customized NAT traversal filters that may support address and/or port translation for application layer control protocols and/or application layer data protocols. For example, the application layer control protocols and/or application layer data protocols may include one or more of a file transfer protocol (FTP), a BitTorrent protocol, a session initiation protocol (SIP), a real time streaming protocol (RTSP), etc.

In one or more embodiments, NAT 364 may monitor network traffic. For example, NAT 364 may open one or more port mappings. For instance, NAT 364 may open one or more port mappings dynamically via an as needed basis. In one or more embodiments, an Ethernet interface, such as an Ethernet interface of Ethernet interfaces 320, 344, and 346, may be or include a software construct. For example, an Ethernet interface of Ethernet interfaces 320, 344, and 346 may be or include an OS and/or a kernel construct that may be associated with a physical network interface or a virtual network interface. In one instance, Ethernet interface 320 may be associated with network interface 180 (e.g., a physical network interface, such as a physical Ethernet interface, a physical wireless Ethernet interface, etc.). In another instance, Ethernet interfaces 344 and 346 may be associated with respective virtual network interfaces. In one or more embodiments, an Ethernet interface may communicate and/or route network traffic on behalf of and/or for one or more other Ethernet interfaces. For example, Ethernet interface 320 may communicate and/or route network traffic on behalf of and/or for one or more of Ethernet interfaces 344 and 346, among others. For instance, Ethernet interface 320 may function as a virtual switch for one or more of Ethernet interfaces 344 and 346, among others.

In one or more embodiments, MAC VLANs may be utilized in Ethernet interface 320 communicating and/or routing network traffic on behalf of and/or for one or more of Ethernet interfaces 344 and 346, among others. For example, MAC addresses of Ethernet interfaces 344 and 346 may be or appear to be virtual ports of Ethernet interface 320. In one instance, Ethernet interface 320 may receive Ethernet packets addressed to a MAC address of Ethernet interface 344 and may provide the packets addressed to the MAC address of Ethernet interface 344 to Ethernet interface 344. In another instance, Ethernet interface 320 may receive Ethernet packets addressed to a MAC address of Ethernet interface 364 and may provide, to Ethernet interface 364, the packets addressed to the MAC address of Ethernet interface 364.

In one or more embodiments, DHCPd 360 may assign addresses from link-local addresses. For example, link local addresses may include addresses from 169.254.0.0/16. In one instance, DHCPd 360 may assign addresses from 169.254.0.0/24. In another instance, DHCPd 360 may assign addresses from 169.254.255.0/24.

Figure 4A:
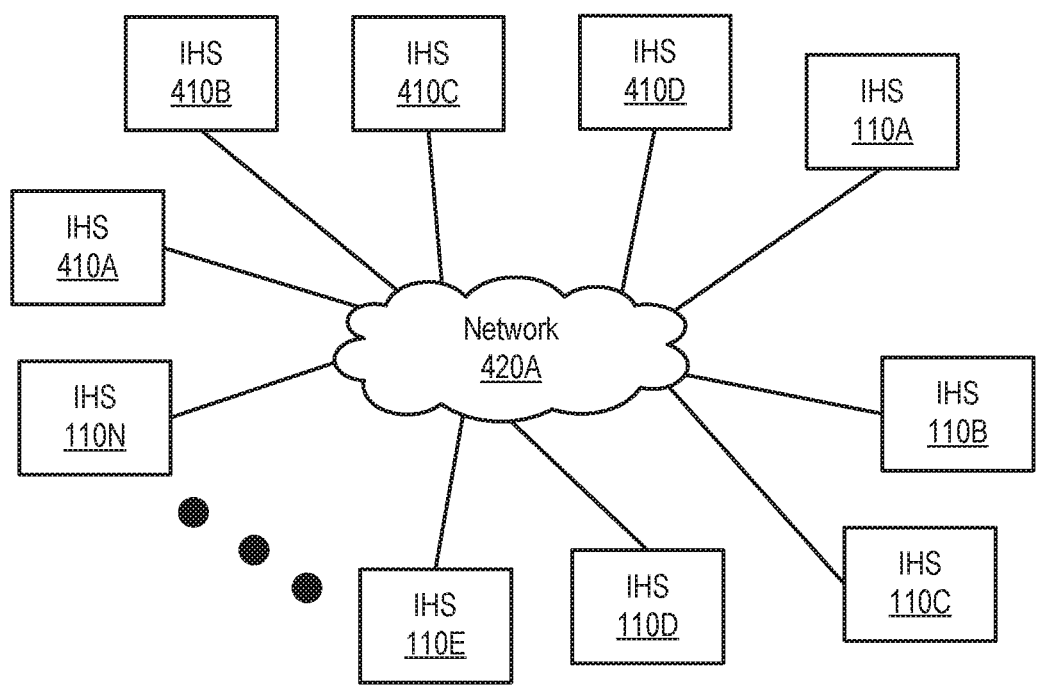
FIG. 4A illustrates an example of information handling systems coupled to a network, according to one or more embodiments.

Turning now to FIG. 4A, an example of information handling systems coupled to a network is illustrated, according to one or more embodiments. As shown, IHSs 110A-110N may be coupled to a network 420A. As illustrated, IHSs 410A-410D may be coupled to network 420A. In one or more embodiments, IHS 410 may include one or more functionalities and/or one or more structures as those described with reference to IHS 110.

Figure 4B:
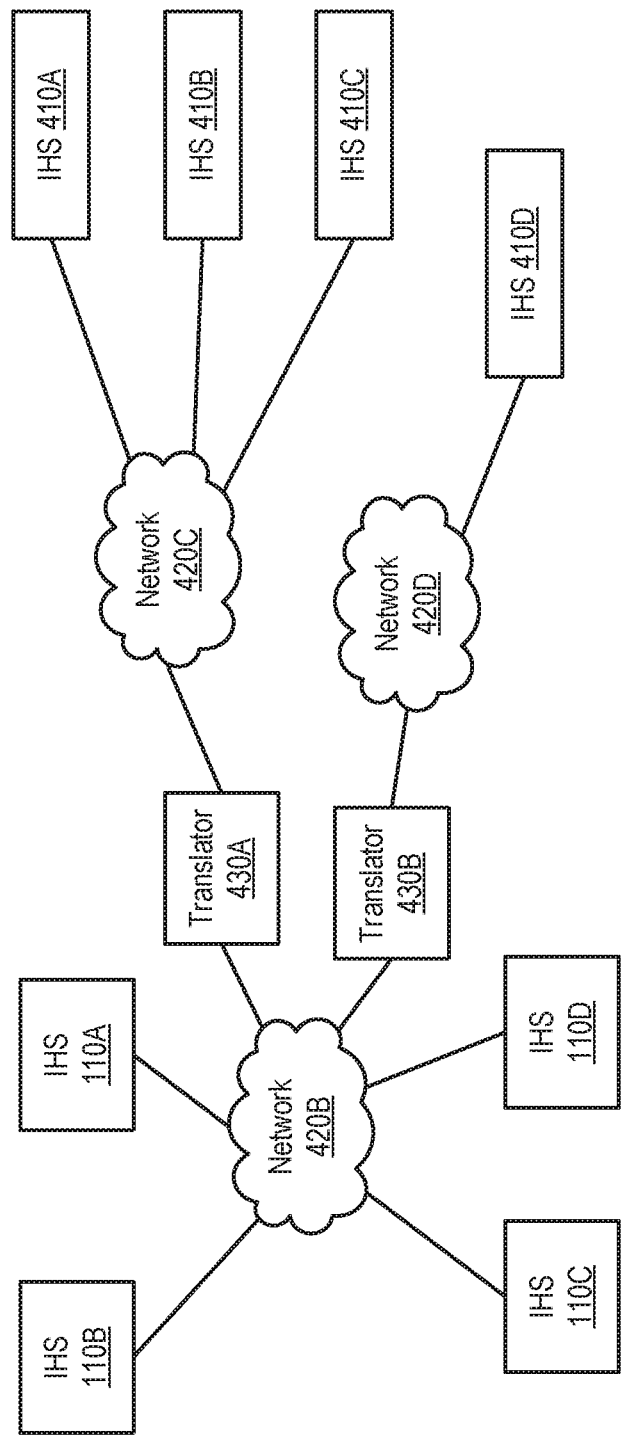
FIG. 4B illustrates an example of information handling systems coupled to networks, according to one or more embodiments.

Turning now to FIG. 4B, an example of information handling systems coupled to networks is illustrated, according to one or more embodiments. As shown, IHS 110A-110D and translators 430A and 420B may be coupled to a network 420B. As illustrated, IHSs 410A-410C and translator 430A may be coupled to a network 420C, and translator 430B and IHS 410D may be coupled to a network 420D. In one or more embodiments, translator 430 may be implemented via an information handling system. In one example, implementing translator 430 may include implementing translator 430 as a native APP. For instance, translator 430 may be implemented as a native APP on an IHS. In a second example, implementing translator 430 may include implementing translator 430 via a virtual machine. In another example, implementing translator 430 may include implementing translator 430 via a container. For instance, translator 430 may include container 330 and/or may be implemented via container 330.

Figure 4C:
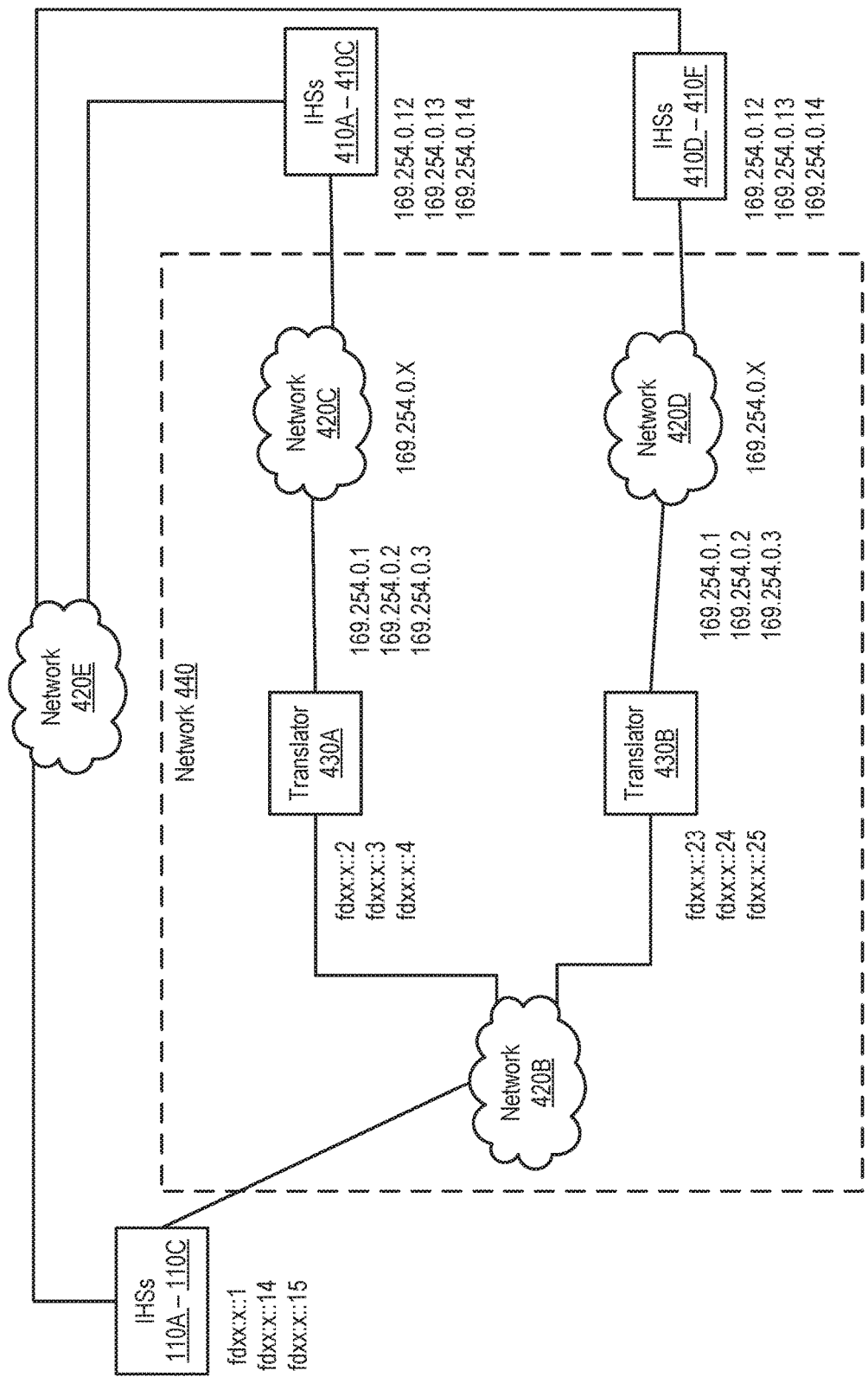
FIG. 4C illustrates an example of an internal network, according to one or more embodiments.

Turning now to FIG. 4C, an example of an internal network is illustrated, according to one or more embodiments. As shown, a network 440 may include network 420B, translators 430A and 430B, and networks 420C and 420D. In one or more embodiments, network 440 may be an internal network. In one or more embodiments, a network 420E may be or include a customer network. In one example, network 440 may not include an IP address that may be utilized in network 420E. In another example, network 440 may not include an IP address that may be utilized by a dual homed IHS. In one instance, one or more of information handling systems (IHSs) 110A-110C, IHSs 410A-410C, and/or IHSs 410D-410F may be dual homed IHSs.

In one or more embodiments, network 420E may utilize any public IP address and/or any private IP address. In one example, IHSs 110A-110C may be dual homed utilizing IPv6 addresses fdxx:x::1, fdxx:x::14, and fdxx:x::15, respectively and three IPv4 addresses of network 420E. In a second example, IHSs 410A-410C may be dual homed utilizing IPv4 link local addresses 169.254.0.12, 169.254.0.13, and 169.254.0.14, respectively, and three IPv4 addresses of network 420E. In another example, IHSs 410D-410F may be dual homed utilizing IPv4 link local addresses 169.254.0.12, 169.254.0.13, and 169.254.0.14, respectively, and three IPv4 addresses of network 420E. In one or more embodiments, one or more of translators 430A and 430B may utilize 169.254.0.0/24 and/or 169.254.255.0/24. In one example, translator 430A may utilize 169.254.0.0/24 and/or 169.254.255.0/24 with network 420C. In another example, translator 430B may utilize 169.254.0.0/24 and/or 169.254.255.0/24 with network 420D.

In one or more embodiments, address spaces 169.254.0.0/24 and 169.254.255.0/24 may be utilized with IHSs of a chassis (e.g., chassis 210A, chassis 210B, etc.). For example, utilizing these two class "C" address spaces may not violate one or more configurations, one or more rules, and/or one or more guidelines described in RFC 3927. In keeping in accordance with RFC 3927, multiple IPv6 addresses may be mapped into different ports associated with a single IPv4 address, according to one or more embodiments. In example, translator 430A may map fdxx:x::2, port 1020 to 169.254.0.1, port 1020 and may map fdxx:x::4, port 1020 to 169.254.0.1, port 11020. In another example, translator 430B may map fdxx:x::24, port 80 to 169.254.0.3, port 80 and may map fdxx:x::23, port 80 to 169.254.0.3, port 1033.

In one or more embodiments, mDNS ALG 370 may advertise DNS service records. For instance, a DNS service record may include a hostname, a service, an address, and a port. In one or more embodiments, translator 430 may convert mDSN or DNS SRV records. In one example, {hostname1, ssh, [fdxx:x::14]:22} may be mapped to {hostname1, ssh, 169.254.0.1:5000}. In another example, {hostname2, ssh, [fdxx:x::15]:22} may be mapped to {hostname2, ssh, 169.254.0.1:5001}. In one or more embodiments, hostnames may convey information. For example, a hostname of blade three in chassis five (e.g., IHS 110C in chassis 210A) may be "blade3.chassis5.local", and if blade two in chassis one (e.g., IHS 1101 in chassis 210B) utilizes ssh (secure shell) to communicate with blade three in chassis five, blade two in chassis one may send a mDNS request for "_ssh._tcp.blade3.chassis5.local". For instance, a NAT mapping may be initialized and a reply may be provided with a mapped IPv4 address/Port number. In one or more embodiments, translator 430 may manage an IHS 410 that may not utilize mDNS and may not utilize DNS SRV to locate a service. For example, IHS 410 may attempt to locate "active-msm.local:80", and if translator 430 receives a DNS address record request that is not tied to a service, translator 430 may map all reserved ports associated with an IPv4 address to an IPv6 address. For instance, this may limit a number of IPv6 address destinations that may be concurrently addressable.

Figure 5:
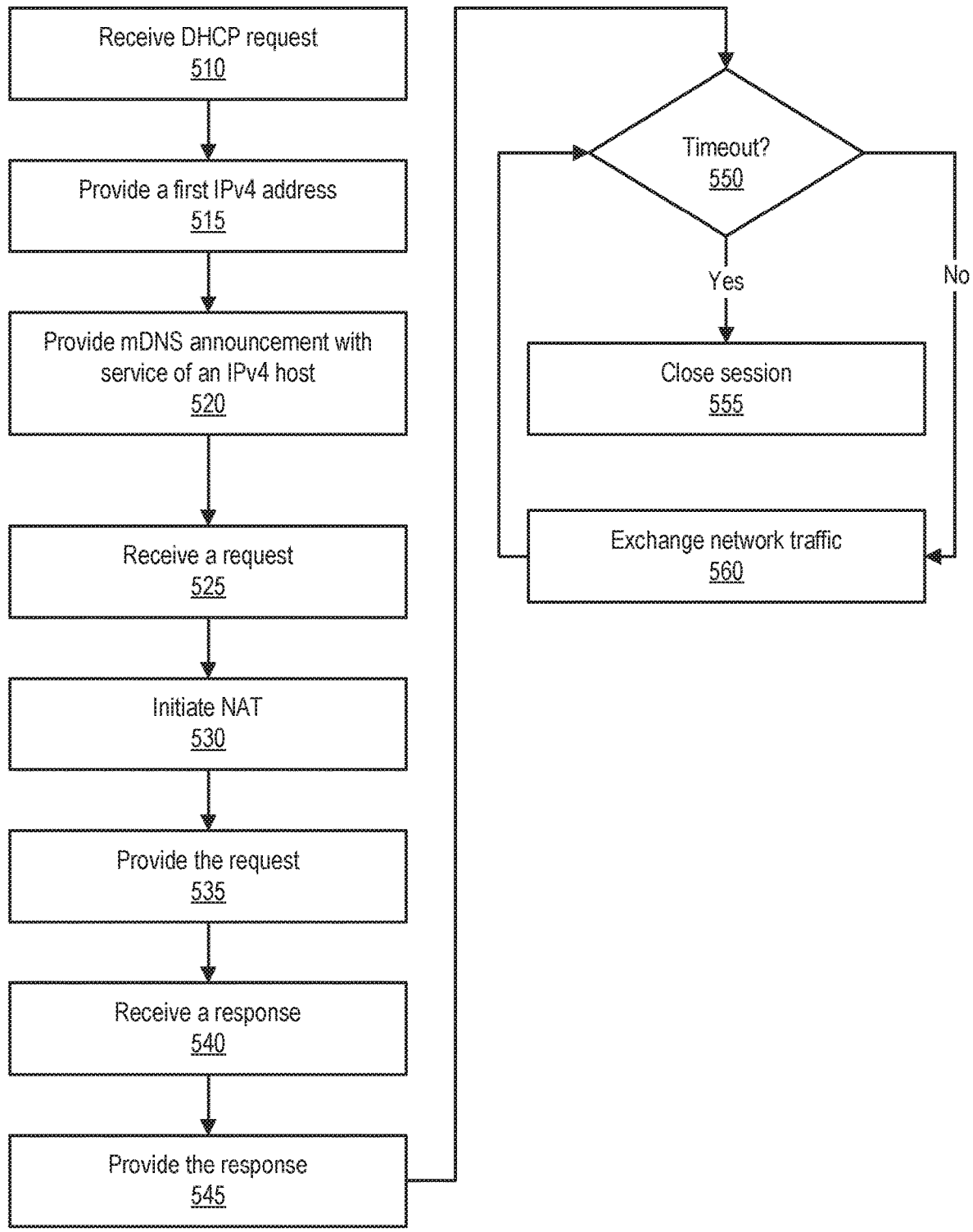
FIG. 5 illustrates a method of operating a translator, according to one or more embodiments.

Turning now to FIG. 5, a method of operating a translator is illustrated, according to one or more embodiments. At 510, a DHCP request may be received. For example, translator 430 may receive the DHCP request. For instance, IPv4 DHCPd 360 may receive the DHCP request. In one or more embodiments, the DHCP request may be received from IHS 410. For example, the DHCP request may be received from IHS 410 via network 420. In one or more embodiments, the DHCP request may or may not include a hostname. For example, if the DHCP request does not include a hostname, IPv4 DHCPd 360 may create and/or associate a hostname with IHS 410. In one instance, a DHCP request that includes a hostname may be received from IHS 410A. In another instance, a DHCP request that does not include a hostname may be received from IHS 410B. If the DHCP request does not include a hostname, IPv4 DHCPd 360 may create and/or associate a hostname with IHS 410B, according to one or more embodiments.

At 515, a first IPv4 address may be provided. For example, IPv4 DHCPd 360 may provide the first IPv4 address. For instance, the first IPv4 address may be provided to IHS 410. In one or more embodiments, the first IPv4 address may be or include a link-local address. For example, the first IPv4 address may be or include an IPv4 unicast link-local address. At 520, a mDNS announcement with service of an IPv4 IHS may be provided. In one or more embodiments, translator 430 may provide the mDNS announcement with service of the IPv4 IHS. For example, the IPv4 IHS may be or include IHS 410. For instance, mDNS ALG 370 may provide the mDNS announcement of IHS 410. In one or more embodiments, the mDNS announcement with service of the IPv4 IHS may include a first IPv6 address associated with the first IPv4 address. For example, the first IPv6 address associated with the first IPv4 address may be based at least on one or more of an IPv6 prefix, the first IPv4 address, and a MAC address of the IPv4 IHS, among others. In one instance, the IPv6 prefix may be based at least on a MAC address of translator 430. In another instance, the IPv6 address associated with the IPv4 address may include a portion of the MAC address of the IPv4 IHS.

At 525, a request may be received. For example, first one or more network packets may include the request. In one instance, translator 430 may receive the request. In another instance, NAT 364 may receive the request. In one or more embodiments, the first one or more network packets may be addressed to the first IPv6 address associated with the first IPv4 address. For example, the first one or more network packets may be or include first one or more IPv6 network packets that may include and/or may be associated with the first IPv6 address associated with the first IPv4 address. For instance, a destination address of the first one or more IPv6 network packets may include the first IPv6 address. At 530, NAT may be initiated. For example, translator 430 may initialize and/or setup a NAT configuration. For instance, NAT 364 may initialize and/or setup the NAT configuration. In one or more embodiments, the NAT configuration may include a mapping between the first IPv6 address and the first IPv4 address. In one or more embodiments, the mapping between the first IPv6 address and the first IPv4 address may include one or more port mappings.

At 535, the request may be provided. For example, translator 430 may provide the request to the IPv4 host. For instance, NAT 364 may provide the request to the IPv4 IHS. In one or more embodiments, providing the request to the IPv4 IHS may include utilizing the first IPv4 address. For example, NAT 364 may provide the request to the IPv4 IHS via first one or more IPv4 network packets that include the request. For instance, the first one or more IPv4 network packets may include the first IPv4 address as a destination address and/or may include one or more payloads and/or one or more portions of one or more payloads of the first IPv6 network packets. At 540, a response may be received. For example, second one or more network packets may include the response. In one instance, translator 430 may receive the response. In another instance, NAT 364 may receive the response. In one or more embodiments, the second one or more network packets may be addressed to a second IPv4 address, different from the first IPv4 address. For example, the second IPv4 address may be associated with a second IPv6 address, different from the first IPv6 address. For instance, the second IPv6 address may be a source address of the first one or more network packets.

At 545, the response may be provided. In one example, translator 430 may provide the response. In another example, NAT 364 may provide the response. In one or more embodiments, providing the response may include providing the response to network 420B. For example, providing the response may include providing the response via second one or more IPv6 packets. For instance, the second one or more IPv6 packets may include the second IPv6 address as a destination address and/or may include one or more payloads and/or one or more portions of one or more payloads of the second one or more network packets. At 550, it may be determined if a timeout has occurred. In one example, translator 430 may determine if the timeout has occurred. In another example, NAT 364 may determine if the timeout has occurred. In one or more embodiments, determining if the timeout has occurred may include determining if an amount of time has passed without receiving network packets from the first IPv4 address and/or without providing network packets to the first IPv4 address.

If the timeout has occurred, a session associated with the first IPv4 address may be closed, at 555. In one example, translator 430 may close the session. In another example, NAT 364 may close the session. In one or more embodiments, closing the session may include removing and/or resetting a NAT configuration. For example, closing the session may include removing and/or resetting the NAT configuration that was initialized via method element 530. If the timeout has not occurred, network traffic may be exchanged, at 560. In one or more embodiments, exchanging the network traffic may include exchanging network traffic between the first IPv4 address and the second IPv6 address. In one example, translator 430 may exchange the network traffic. In another example, NAT 364 may exchange the network traffic. In one embodiment, the method may proceed to 550.

Figure 6:
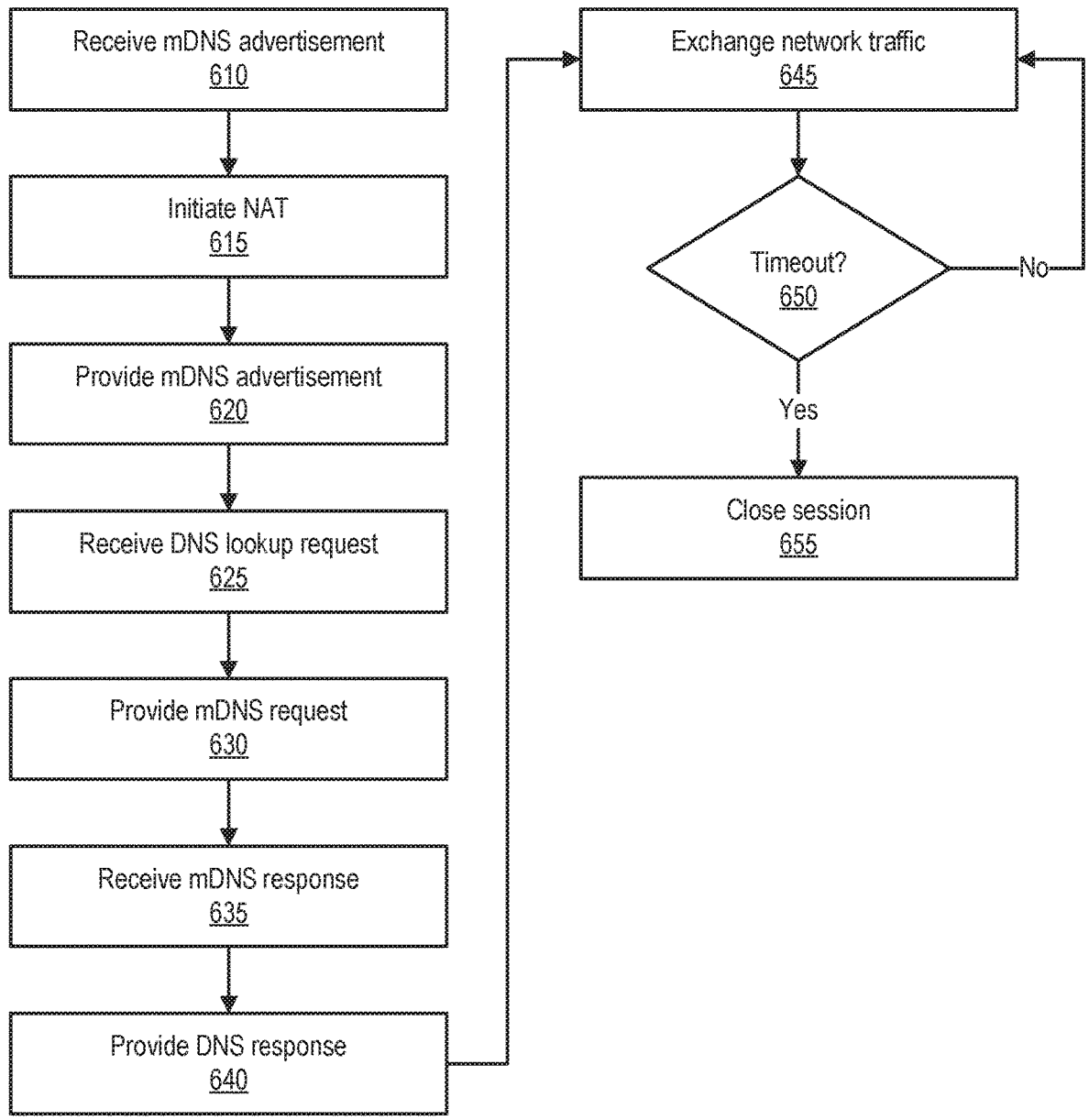
FIG. 6 illustrates another method of operating a translator, according to one or more embodiments.

Turning now to FIG. 6, another method of operating a translator is illustrated, according to one or more embodiments. At 610, a mDNS advertisement may be received. In one example, translator 430 may receive the mDNS advertisement. In a second example, NAT 364 may receive the mDNS advertisement. In another example, IPv4 DNS 350 may receive the mDNS advertisement. In one or more embodiments, the mDNS advertisement may include a hostname and a first IPv6 address. At 615, NAT may be initiated. For example, translator 430 may initialize and/or setup a NAT configuration. For instance, NAT 364 may initialize and/or setup the NAT configuration. In one or more embodiments, the NAT configuration may include a mapping between the first IPv6 address and a first IPv4 address. In one or more embodiments, the mapping between the first IPv6 address and the first IPv4 address may include one or more port mappings.

At 620, the mDNS advertisement may be provided. In one example, translator 430 may provide the mDNS advertisement. In another example, NAT 364 may provide the mDNS advertisement. At 625, a DNS lookup request may be received. In one example, translator 430 may receive the DNS lookup request. In another example, NAT 364 may receive the DNS lookup request. In one or more embodiments, the DNS lookup request may be received from an IPv4 IHS. For example, the IPv4 IHS may be or include IHS 410. In one or more embodiments, the IPv4 IHS may be associated with a second IPv4 address. For example, the first IPv4 address may be or include a first link-local address, and/or the second IPv4 address may be or include a second link-local address. At 630, a mDNS request may be provided. In one example, translator 430 may provide the mDNS request. In another example, NAT 364 may provide the mDNS request. In one or more embodiments, the mDNS request may be based at least on the DNS lookup request. For example, the DNS lookup may include a request for "MSM-22.local", and the mDNS request may include a request for "MSM-22.local". In one or more embodiments, the mDNS request may be provided to network 420B.

At 635, a mDNS response may be received. In one example, translator 430 may receive the mDNS response. In a second example, NAT 364 may receive the mDNS response. In another example, IPv4 DNS 350 may receive the mDNS response. In one or more embodiments, the mDNS response may include a network address. For example, the mDNS response may include an IPv4 address. For instance, the IPv4 address of the mDNS response may be or include the first IPv4 address. At 640, a DNS response may be provided. In one example, translator 430 may provide the DNS response. In a second example, NAT 364 may provide the DNS response. In another example, IPv4 DNS 350 may provide the DNS response. In one or more embodiments, the DNS response may include an IPv4 address. For instance, the IPv4 address of the DNS response may be or include the first IPv4 address.

At 645, network traffic may be exchanged. In one or more embodiments, exchanging the network traffic may include exchanging network traffic between the second IPv4 address and the first IPv6 address. In one example, translator 430 may exchange the network traffic. In another example, NAT 364 may exchange the network traffic. In one embodiment, the method may proceed to 650. In one or more embodiments, exchanging network traffic between the second IPv4 address and the first IPv6 address may include exchanging network traffic between the second IPv4 address and the first IPv4 address.

At 650, it may be determined if a timeout has occurred. In one example, translator 430 may determine if the timeout has occurred. In another example, NAT 364 may determine if the timeout has occurred. In one or more embodiments, determining if the timeout has occurred may include determining if an amount of time has passed without receiving network packets from the second IPv4 address and/or without providing network packets to the second IPv4 address. In one or more embodiments, determining if the timeout has occurred may include determining if an amount of time has passed without receiving network packets from the first IPv6 address and/or without providing network packets to the first IPv6 address.

If the timeout has occurred, a session associated with the first IPv6 address may be closed, at 655. In one example, translator 430 may close the session. In another example, NAT 364 may close the session. In one or more embodiments, closing the session may include removing and/or resetting a NAT configuration. For example, closing the session may include removing and/or resetting the NAT configuration that was initialized via method element 615. If the timeout has not occurred, network traffic may be exchanged, at 645.

Figure 7:
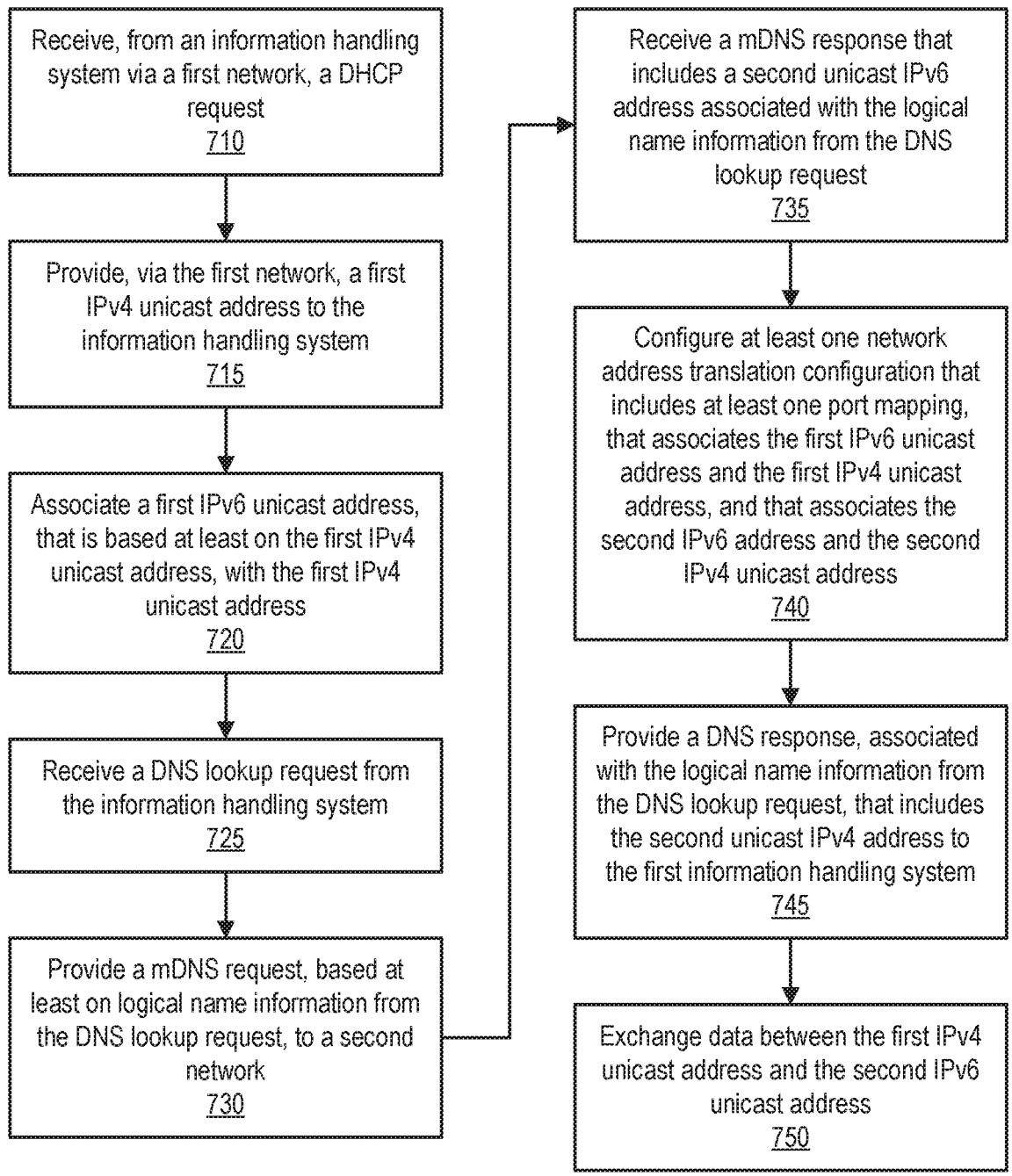
FIG. 7 illustrates a method of operating an information handling system, according to one or more embodiments.

Turning now to FIG. 7, a method of operating an information handling system is illustrated, according to one or more embodiments. At 710, a DHCP discovery request may be received from a first information handling system via a first network. In one example, translator 430A may receive a DHCP discovery request may be received from IHS 410A via network 420C. For instance, translator 430A may receive one or more IPv4 packets that include the DHCP discovery request. In another example, translator 430B may receive a DHCP discovery request may be received from IHS 410D via network 420D. For instance, translator 430B may receive one or more IPv4 packets that include the DHCP discovery request. In one or more embodiments, DHCPd 360 may receive the DHCP discovery request. At 715, a first IPv4 unicast address of the first information handling system may be provided via the first network. In one example, translator 430A may provide a first IPv4 unicast address to IHS 410A via network 420C. In another example, translator 430B may provide a first IPv4 unicast address to IHS 410D via network 420D. In one or more embodiments, DHCPd 360 may provide the first IPv4 unicast address. In one or more embodiments, the first IPv4 unicast address may be or include a link-local IPv4 unicast address. In one or more embodiments, providing the first IPv4 unicast address of the first information handling system may be performed in response to receiving the DHCP discovery from the first information handling system.

At 720, a first IPv6 unicast address, that is based at least on the first IPv4 unicast address, may be associated with the IPv4 unicast address. In one example, translator 430A may associate a first IPv6 unicast address, that is based at least on the first IPv4 unicast address, with the IPv4 unicast address. In another example, translator 430B may associate a first IPv6 unicast address, that is based at least on the first IPv4 unicast address, with the IPv4 unicast address. In one or more embodiments, the first IPv6 address may be further based at least on a MAC address. In one example, the first IPv6 address may be further based at least on a MAC address of IHS 410. In another example, the first IPv6 address may be further based at least on a MAC address of a container (e.g., container 330). In one instance, the first IPv6 address may be further based at least on a MAC address of Ethernet interface 346. In another instance, the first IPv6 address may be further based at least on a MAC address of Ethernet interface 344. In one or more embodiments, the first IPv6 address may be a unique local IPv6 unicast address. In one or more embodiments, NAT 364 may associate a first IPv6 unicast address, that is based at least on the first IPv4 unicast address, with the IPv4 unicast address.

At 725, a DNS lookup request from the first information handling system may be received. In one example, translator 430A may receive a DNS lookup request from IHS 410A. In another example, translator 430B may receive a DNS lookup request from IHS 410D. In one or more embodiments, IPv4 DNS 350 may receive the DNS lookup request from the first information handling system. At 730, a mDNS request, based at least on logical name information from the DNS lookup request, may be provided to a second network, different from the first network. In one example, translator 430A may provide a mDNS request, based at least on logical name information from the DNS lookup request, may be provided to network 420B. In another example, translator 430B may provide a mDNS request, based at least on logical name information from the DNS lookup request, may be provided to network 420B. In one or more embodiments, the logical name information may include a hostname. In one example, the hostname may include "hostname.example.com". In a second example, the hostname may include "_msm._tcp.local". In another example, the hostname may include "msm-active.local". In one or more embodiments, providing the mDNS request to the second network may be performed in response to the receiving the DNS lookup request.

At 735, a mDNS response that includes a second unicast IPv6 address associated with the logical name information from the DNS lookup request may be received. In one example, translator 430A may receive a mDNS response that includes a second unicast IPv6 address associated with the logical name information from the DNS lookup request. In another example, translator 430B may receive a mDNS response that includes a second unicast IPv6 address associated with the logical name information from the DNS lookup request. In one or more embodiments, IPv4 mDNS ALG 370 may receive the mDNS response that includes the second unicast IPv6 address associated with the logical name information from the DNS lookup request.

At 740, at least one network address translation configuration that includes at least one port mapping, that associates the first IPv6 unicast address and the first IPv4 unicast address, and that associates the second IPv6 unicast address and a second IPv4 may be configured. In one example, translator 430A may configure at least one network address translation configuration that includes at least one port mapping, that associates the first IPv6 unicast address and the first IPv4 unicast address, and that associates the second IPv6 unicast address and a second IPv4. In another example, translator 430B may configure at least one network address translation configuration that includes at least one port mapping, that associates the first IPv6 unicast address and the first IPv4 unicast address, and that associates the second IPv6 unicast address and a second IPv4. In one or more embodiments, NAT 364 may configure the at least one network address translation configuration that includes the at least one port mapping, that associates the first IPv6 unicast address and the first IPv4 unicast address, and that associates the second IPv6 unicast address and the second IPv4.

In one or more embodiments, the at least one port mapping may include one or more network ports or all network ports. For example, a network port may correspond to and/or be associated with a network port number. For instance, port numbers in a range from 0 to 1023 may be or include well-known ports and/or system ports. In one or more embodiments, configuring at least one network address translation configuration that includes at least one port mapping, that associates the first IPv6 unicast address and the first IPv4 unicast address, and that associates the second IPv6 unicast address and a second IPv4 may be performed in response to receiving the mDNS response that includes the second unicast IPv6 address associated with the logical name information from the DNS lookup request.

At 745, a DNS response, associated with the logical name information from the DNS lookup request, that includes the second unicast IPv4 address may be provided to the first information handling system. In one example, translator 430A may provide a DNS response, associated with the logical name information from the DNS lookup request, that includes the second unicast IPv4 address may be provided to IHS 410A. In another example, translator 430B may provide a DNS response, associated with the logical name information from the DNS lookup request, that includes the second unicast IPv4 address may be provided to IHS 410D. In one or more embodiments, IPv4 DNS 350 may provide the DNS response, associated with the logical name information from the DNS lookup request, that includes the second unicast IPv4 address may be provided to the first information handling system.

At 750, data between the first IPv4 unicast address and the second IPv6 unicast address may be exchanged. In one example, translator 430A may exchange data between the first IPv4 unicast address and the second IPv6 unicast address. In another example, translator 430B may exchange data between the first IPv4 unicast address and the second IPv6 unicast address. In one or more embodiments, NAT 364 may exchange data between the first IPv4 unicast address and the second IPv6 unicast address. In one or more embodiments, exchanging data between the first IPv4 unicast address and the second IPv6 unicast address may include receiving an IPv4 packet from the first information handling system, where the IPv4 packet includes the first IPv4 unicast address as a source address of the IPv4 packet, the second IPv4 unicast address as a destination address of the IPv4 packet, and payload data, and providing an IPv6 packet to the second network, where the IPv6 packet include the first IPv6 unicast address as a source address of the IPv6 packet, the second IPv6 unicast address as a destination address of the IPv6 packet, and the payload data. In one or more embodiments, exchanging data between the first IPv4 unicast address and the second IPv6 unicast address may include receiving an IPv6 packet from the second network, where the IPv6 packet includes the second IPv6 unicast address as a source address of the IPv6 packet, the first IPv6 unicast address as a destination address of the IPv6 packet, and payload data and providing one or more IPv4 packets to the first information handling system, where the one or more IPv4 packets include the second IPv4 unicast address as a source address of the IPv4 packet, the first IPv4 unicast address as a destination address of the IPv4 packet, and one or more respective portions of the payload data.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
    a translator associated with a media access control (MAC) address, the translator communicably coupled to a processor having access to memory media storing instructions executable by the processor to perform operations comprising:
    receive, from a first information handling system via a first network, a dynamic host configuration protocol discovery request;
    in response to receiving the dynamic host configuration protocol discovery request, provide, via the first network, a first Internet protocol version four (IPv4) unicast address to the first information handling system;
    associate a first Internet protocol version six (IPv6) unicast address with the first IPv4 unicast address, the first IPv6 unicast address based at least on the MAC address associated with the translator;
    receive a domain name service (DNS) lookup request from the first information handling system;
    in response to receiving the DNS lookup request, provide a multicast DNS (mDNS) request, based at least on logical name information from the DNS lookup request, to a second network, different from the first network;

provide, to the second network, a mDNS announcement based at least on a hostname of the first information handling system;

receive a mDNS response that includes a second IPv6 unicast address, the second IPv6 unicast address associated with the logical name information from the DNS lookup request;

in response to receiving the mDNS response that includes the second IPv6 unicast address associated with the logical name information from the DNS lookup request, configure at least one network address translation configuration that includes at least one port mapping, that associates the first IPv6 unicast address and the first IPv4 unicast address, and that associates the second IPv6 unicast address and a second IPv4 unicast address;

provide a DNS response, associated with the logical name information from the DNS lookup request, that includes the second IPv4 unicast address to the first information handling system;

receive an IPv4 packet from the first information handling system, wherein the IPv4 packet includes the first IPv4 unicast address as a source address of the IPv4 packet, the second IPv4 unicast address as a destination address of the IPv4 packet, and payload data; and provide an IPv6 packet to the second network, wherein the IPv6 packet includes the first IPv6 unicast address as a source address of the IPv6 packet, the second IPv6 unicast address as a destination address of the IPv6 packet, and the payload data.

2. The information handling system of claim 1, the operations further comprising:

exchange data between the first IPv4 unicast address and the second IPv6 unicast address.

3. The information handling system of claim 1, wherein the first information handling system is a portable wireless information handling system, configured to be handheld by user and operable to communicate with a second information handling system via the second IPv4 address.

4. The information handling system of claim 1, wherein the first IPv4 unicast address is an IPv4 unicast link-local address.

5. A method, comprising:

receiving, by a translator of an information handling system, a dynamic host configuration protocol discovery request from a first information handling system via a first network, the translator associated with a media access control (MAC) address;

in response to the receiving the dynamic host configuration protocol discovery request, providing, via the first network, a first Internet protocol version four (IPv4) unicast address to the first information handling system;

associating a first Internet protocol version six (IPv6) unicast address with the first IPv4 unicast address, the first IPv6 unicast address based at least on the MAC address associated with the translator;

receiving a domain name service (DNS) lookup request from the first information handling system;

in response to the receiving the DNS lookup request, providing a multicast DNS (mDNS) request, based at least on logical name information from the DNS lookup request, to a second network, different from the first network;

providing, to the second network, a mDNS announcement based at least on a hostname of the first information handling system;

receiving a mDNS response that includes a second IPv6 unicast address, the second IPv6 unicast address associated with the logical name information from the DNS lookup request;

in response to the receiving the mDNS response that includes the second IPv6 unicast address associated with the logical name information from the DNS lookup request, configuring at least one network address translation configuration that includes at least one port mapping, that associates the first IPv6 unicast address and the first IPv4 unicast address, and that associates the second IPv6 unicast address and a second IPv4 unicast address;

providing a DNS response, associated with the logical name information from the DNS lookup request, that includes the second IPv4 unicast address to the first information handling system;

receiving an IPv4 packet from the first information handling system, wherein the IPv4 packet includes the first IPv4 unicast address as a source address of the IPv4 packet, the second IPv4 unicast address as a destination address of the IPv4 packet, and payload data; and providing an IPv6 packet to the second network, wherein the IPv6 packet include the first IPv6 unicast address as a source address of the IPv6 packet, the second IPv6 unicast address as a destination address of the IPv6 packet, and the payload data.

6. The method of claim 5, further comprising:

exchanging data between the first IPv4 unicast address and the second IPv6 unicast address.

7. The method of claim 5, wherein the first information handling system is a portable wireless information handling system, configured to be handheld by user and operable to communicate with a second information handling system via the second IPv4 address.

8. The method of claim 5, wherein the first IPv4 unicast address is an IPv4 unicast link-local address.

9. A computer-readable non-transitory memory medium that includes instructions that, when executed by at least one processor of an information handling system, cause the information handling system to:

receive, by a translator of the information handling system, a dynamic host configuration protocol discovery request from a first information handling system via a first network, the translator associated with a media access control (MAC) address;

in response to receiving the dynamic host configuration protocol discovery request, provide, by the translator via the first network, a first Internet protocol version four (IPv4) unicast address to the first information handling system;

associate, by the translator, a first Internet protocol version six (IPv6) unicast address with the first IPv4 unicast address, the first IPv6 unicast address based at least on the MAC address associated with the translator;

receive, by the translator, a domain name service (DNS) lookup request from the first information handling system;

in response to receiving the DNS lookup request, provide, by the translator, a multicast DNS (mDNS) request, based at least on logical name information from the DNS lookup request, to a second network, different from the first network;

provide, to the second network, a mDNS announcement based at least on a hostname of the first information handling system;

receive, by the translator, a mDNS response that includes a second IPv6 unicast address, the second IPv6 unicast address associated with the logical name information from the DNS lookup request;

in response to receiving the mDNS response that includes the second IPv6 unicast address associated with the logical name information from the DNS lookup request, configure, by the translator, at least one network address translation configuration that includes at least one port mapping, that associates the first IPv6 unicast address and the first IPv4 unicast address, and that associates the second IPv6 unicast address and a second IPv4 unicast address;

provide, by the translator, a DNS response, associated with the logical name information from the DNS lookup request, that includes the second IPv4 unicast address to the first information handling system;

receive, by the translator, an IPv4 packet from the first information handling system, wherein the IPv4 packet includes the first IPv4 unicast address as a source address of the IPv4 packet, the second IPv4 unicast address as a destination address of the IPv4 packet, and payload data; and provide, by the translator, an IPv6 packet to the second network, wherein the IPv6 packet includes the first IPv6 unicast address as a source address of the IPv6 packet, the second IPv6 unicast address as a destination address of the IPv6 packet, and the payload data.

10. The computer-readable non-transitory memory medium of claim 9, wherein the instructions further cause the information handling system to:

exchange data between the first IPv4 unicast address and the second IPv6 unicast address.

11. The computer-readable non-transitory memory medium of claim 9, wherein the first information handling system is a portable wireless information handling system, configured to be handheld by user and operable to communicate with a second information handling system via the second IPv4 address.

* * * * *